J. D. O'CONNELL.
POULTRY AND HEN FEEDER.
APPLICATION FILED JULY 16, 1907.
920,381.
Patented May 4, 1909.
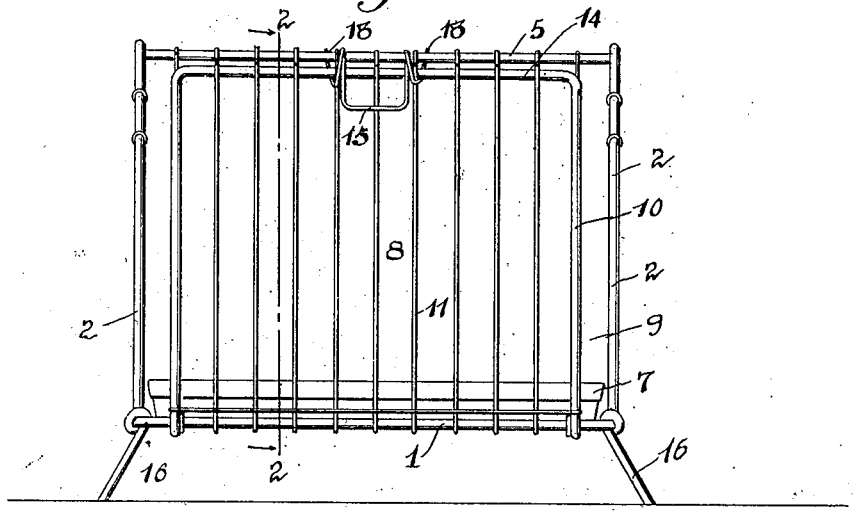
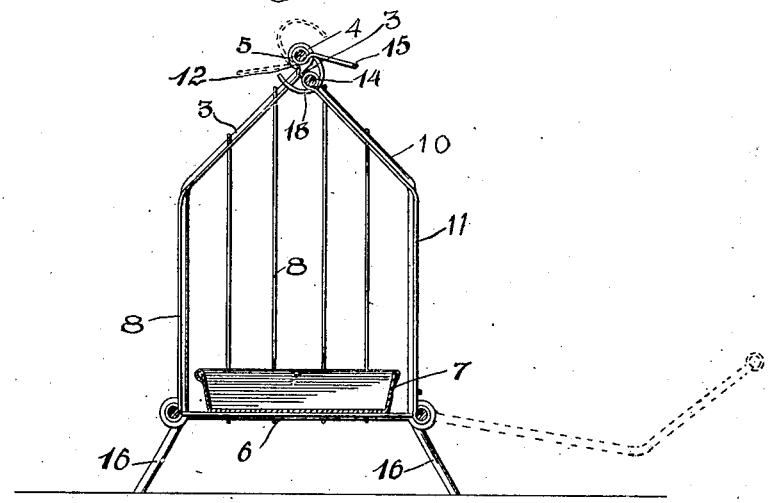
Witnesses:
Florence M. Howe.
William G. Hamilton
Inventor:
John D. O'Connell

UNITED STATES PATENT OFFICE.

JOHN D. O'CONNELL, OF MARLBORO, MASSACHUSETTS.

POULTRY AND HEN FEEDER.

No. 920,381.   Specification of Letters Patent.   Patented May 4, 1909.

Application filed July 16, 1907.   Serial No. 384,122.

*To all whom it may concern:*

Be it known that I, JOHN D. O'CONNELL, a citizen of the United States, and a resident of Marlboro, in the county of Middlesex and State of Massachusetts, have invented a new and useful Poultry and Hen Feeder, of which the following is a specification.

This invention relates to new and useful improvements in poultry and hen feeders and has for its object to provide a simple and inexpensive device of this kind constructed of wire.

A further object of the invention is to provide a device of this kind with a pivoted section or door which may be lowered to permit removal of the feed containing receptacle and also to provide a pivoted clasp for normally maintaining the pivoted section or door in closed position.

With these and other objects in view, the invention consists of certain novel features of construction, combination and arrangement of parts as will be more fully described and particularly pointed out in the appended claim.

In the accompanying drawings, Figure 1 is a side elevation of a poultry and hen feeder constructed in accordance with my invention; and Fig. 2 is a vertical transverse section taken on the plane indicated by the line 2—2 of Fig. 1, looking in the direction indicated by the arrows, the dotted lines showing the lowered position of the pivoted section or door and the dotted lines at the top of the figure indicating the position of the clasp in releasing position.

In the embodiment illustrated, the device comprises an approximately rectangular base 1 constructed from a stout piece of wire, end frames 2 which are also constructed from pieces of stout wire, each of the end frames being formed at its upper end with converging portions 3 which are looped at the extreme upper ends of said frames, as at 4, to receive the ends of a centrally and horizontally disposed top wire 5 which adds to the strength and rigidity of the structure. A plurality of longitudinally spaced wires of relatively small diameter are arranged between opposite sides of the base 1 and constitute a floor 6 for the feed containing receptacle 7 which may be of any appropriate shape. One side and both ends of the feeder are also closed in by vertically disposed wires 8 which extend between the base, side and end frames, said wires being of relatively small diameters and spaced sufficiently apart to permit the hens to readily obtain the feed contained in the receptacle 7. The other side of the feeder is closed in by a vertically pivoted door or section 8 comprising an approximately inverted U-shaped frame 9 pivoted at the lower or outer ends of its side pieces 10 to one of the side pieces of the base 1 and a plurality of vertically disposed longitudinally spaced frame wires 11.

The pivoted section or door of the feeder is held in closed position by a pivoted catch 12 which is pivoted to the central portion of the wire 5 and comprises curved hook portions 18 which are adapted to engage the upper cross piece 14 of the pivoted section or door and a handle portion 15 by means of which said hook portions may be engaged with or released from said pivoted section. It will be understood that in order to remove the receptacle 7, the pivoted section or door is released from the catch and lowered as indicated by dotted lines in Fig. 2 and that while the chickens are feeding from this receptacle, the pivoted section is closed and held in this position by the pivoted catch. The feeder is also provided with supporting legs 16 which may be formed by prolongations of the wires forming the end frames.

From the foregoing description, taken in connection with the accompanying drawings, the construction and operation of the invention will be readily understood without requiring a more extended explanation.

Various changes in the form, proportions and the minor details of construction may be resorted to without departing from the principle or sacrificing any of the advantages of this invention as defined in the appended claim.

Having thus described and ascertained the nature of my invention, what I claim as new and desire to secure by Letters-Patent is:

An upright feeder of the class described comprising a rigid open base, comprising an outer wire forming the frame of the base and inner smaller wires, said base adapted to form a support for a feed pan, a horizontal top wire, rigid end pieces, each comprising an outer wire bent at its center around one end of the top wire and near its ends around the side pieces of the outer wire of the base to form supporting legs, a section pivoted upon one side of the outer wire of the base and forming the other side of the feeder, and a catch pivoted to the top wire for connecting the upper free end of the pivoted section thereto.

In testimony whereof I have affixed my signature, in presence of two witnesses.

JOHN D. O'CONNELL.

Witnesses:
 FLORENCE M. HOWE,
 MARTHA D. BARRY.